United States Patent [19]
Joss et al.

[11] Patent Number: 5,823,495
[45] Date of Patent: Oct. 20, 1998

[54] MOUNTING APPARATUS FOR A HIGH POWER MOBILE RADIO

[75] Inventors: Steve M. Joss, Pompano Beach; William H. Robertson, Jr., Plantation; Elias R. Mallar, Miami, all of Fla.

[73] Assignee: Motorola, Inc., Schaumburg, Ill.

[21] Appl. No.: 797,070

[22] Filed: Feb. 10, 1997

[51] Int. Cl.⁶ ........................................................ A47F 5/00
[52] U.S. Cl. ...................... 248/309.1; 248/27.1; 361/825; 455/89; 455/90
[58] Field of Search ................................ 248/309.1, 310, 248/27.1; 361/814, 825; 455/90, 128, 89

[56] References Cited

U.S. PATENT DOCUMENTS

| | | | |
|---|---|---|---|
| 4,094,485 | 6/1978 | O'Callaghan | 248/309.1 |
| 4,696,449 | 9/1987 | Woo et al. | 248/309.1 |
| 5,193,890 | 3/1993 | Robertson, Jr. et al. | 248/27.1 |

*Primary Examiner*—Leslie A. Braun
*Assistant Examiner*—Tan Le
*Attorney, Agent, or Firm*—Dale W. Dorinski

[57] ABSTRACT

A mounting apparatus for securing a mobile radio includes a mounting tray (102) having a flat surface (104), radio housing attachment wings (106) and a pair of radio receiving portions (108). The flat surface has recessed fastening locations (110) for attaching the mounting tray to a surface using screws or bolts. A rubber pad (114) is affixed to the inside of each attachment wing (106) such that an opening (115) in the pad is aligned with an opening (112) in the attachment wing. The radio receiving portions (108) each have a cut-out (109) for receiving the rear of the mobile radio. A high tensile strength spring (118) is riveted (130) to the flat surface (104) of the tray and has an L-shaped end (122) prevents the spring from deforming if an unexpectedly large force is applied to the top of the radio. Together, these features act to dampen any vibrations, etc. which could damage internal radio circuitry.

15 Claims, 2 Drawing Sheets

MOUNTING APPARATUS FOR A HIGH POWER MOBILE RADIO

TECHNICAL FIELD

This invention relates in general to mechanical mounting structure and more specifically to a mounting tray for an electronic device.

BACKGROUND

Mounting trays for electronic devices such as mobile radios are well known in the art. Mounting trays are essentially brackets which are mounted to a vehicle (or other location) for removably receiving a mobile radio or other electronic device. Mounting trays allow mobile radios, which tend to be large and heavy, to be mounted in motor vehicles such as cars, boats and other locations where a mobile radio may be required to be mounted. Mounting trays allow mobile radios to be secured in a fixed location in order to protect the radios from moving around; especially when mounted to a motor vehicle moving over rough terrain.

Any radio which is to be mounted in a vehicle must be sufficiently secured to prevent damage which may result to internal radio components if the radio is subjected to vibration, rattling, mechanical shock, etc. For the most part, existing mounting trays or brackets are insufficient for securing high power mobile radios—which tend to be heavy. Commonly assigned U.S. Pat. No. 5,193,890 by Robertson, Jr. et al. provides a mounting tray for a high power mobile radio, wherein the radio is restrained in all degrees of freedom to prevent vibration, looseness and noise. Although Robertson, Jr. provides a marked improvement over prior mobile radio mounting schemes, it is not amenable to all types of mobile radio housings. Variations in mobile radio housing designs necessitate different mounting structures. For instance, while Robertson, Jr. incorporates a mounting tray which acts as the bottom outer wall (or closure) of the radio housing, an alternate mobile radio design provides a housing which has a bottom wall and is designed for attachment (to a mounting structure) at opposing sides of the housing.

For the foregoing reasons, a need exists for an improved mounting apparatus for mobile radio communications equipment requiring side attachment. The mounting apparatus must dampen vibration, rattling, mechanical shock, etc. which, if imparted to the radio housing, could have a deleterious effect on the function of the radio. Furthermore, the mounting apparatus must sufficiently secure the radio to preclude detachment of the radio from the mounting tray during a sudden shock or jolt, e.g., during a vehicle collision.

DETAILED DESCRIPTION OF THE PREFERRED EMBODIMENT

Figure 1:
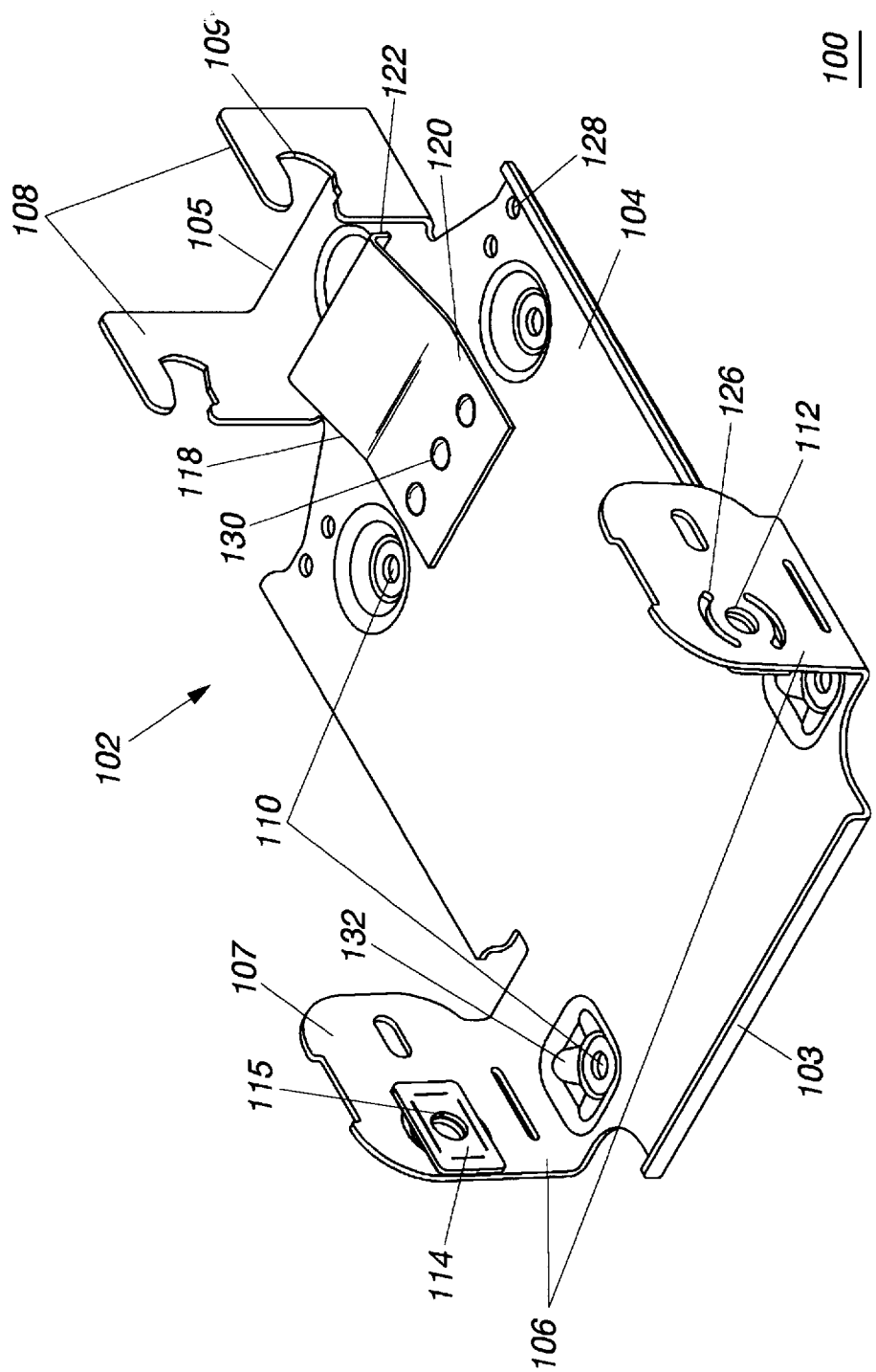
FIG. 1 an isometric view of a mobile radio mounting apparatus in accordance with the present invention.

While the specification concludes with claims defining the features of the invention that are regarded as novel, it is believed that the invention will be better understood from a consideration of the following description in conjunction with the drawing figures.

In FIG. 1, a mounting apparatus 100 for securing an electronic device, such as a mobile radio, is shown. The mounting apparatus includes a mounting tray 102 to which the electronic device (not shown) is attached. The mounting tray comprises a substantially planar surface 104, a pair of upstanding device attachment tabs 106 and a pair of rear receiving portions 108. In the preferred embodiment of the invention, the mounting tray 102 is cut from a single sheet of metal, e.g., cold rolled steel, and then formed by progressive dies. Those skilled in the art will appreciate that alternative tray compositions could be employed. For example, the mounting tray could be manufactured as a molded polymer. The planar surface has a plurality of recessed fastening locations 110 for securing the mounting tray to a surface, e.g, an automobile dashboard. The recessed fastening locations 110 are used primarily to fasten the mounting tray using common fasteners such as screws or bolts. Since the recessed fastening locations extend below the planar surface 104, i.e., acting as standoffs, tray 102 may be attached to an irregular, or nonplanar, surface. Embossments 132 may be formed in recessed fastening locations 110 for reducing stress. Device attachment tabs 106 extend upwardly from opposing sides of planar surface 104 proximate to front end 103. The attachment tabs face each other and have planes which are parallel to one another and perpendicular to planar surface 104. Each of the tabs 106 has a fastener opening 112 therethrough. In the preferred embodiment of the invention, each fastener opening is partially surrounded by at least one radial opening 126. The radial opening(s) provide a locking mechanism for a threaded fastener (not shown), such as a wing screw, by isolating the area being compressed by the fastener. As a result, the fastener is less likely to loosen when mounting tray 102 is subjected to vibration, etc. Rear receiving portions 108 extend upwardly from opposing sides of planar surface 104 proximate to rear end 105. The receiving portions have planes parallel to one another and perpendicular to rear end 105. Each receiving portion has a cammed roll-in feature 109 for receiving a rear portion of an electronic device. Mounting apparatus 100 may further comprise a cable strain relief mechanism for cables emanating from a mounted mobile radio. For instance, cable strain relief may be provided by running cables between openings 128 in the planar surface and then using a cable tie wrap to group cables and restrict their movement.

The mounting apparatus further comprises a pad 114 affixed, e.g., via an adhesive, to an inner surface 107 of each attachment tab 106, and a high tensile strength spring 118. Pad 114 provides a buffer between attachment tab 106 and the mobile radio (not shown), acting to dampen any vibration, mechanical shock, etc. imparted to the mobile radio via the attachment tab. Although we prefer that pad 114 be constructed from a compliant elastomeric material, any composition with desired dampening properties is a potential candidate. Each pad has a pad opening 115 concentric with corresponding fastener opening 112. Spring 118 has a middle section 120 fixedly attached to planar surface 104. In the preferred embodiment of the invention, the spring is attached using at least one rivet 130. A first end 122 of spring 118 forms an integral spring stopping mechanism which acts to protect the spring from any permanent deformation which might otherwise result upon the application of excessive force to the spring. The spring acts to further dampen vibration, mechanical shock, etc. imparted to the mobile radio via planar surface 104. The compressibility of pad 114 and spring 118 has the added benefit of providing design tolerance forgiveness.

Figure 2:
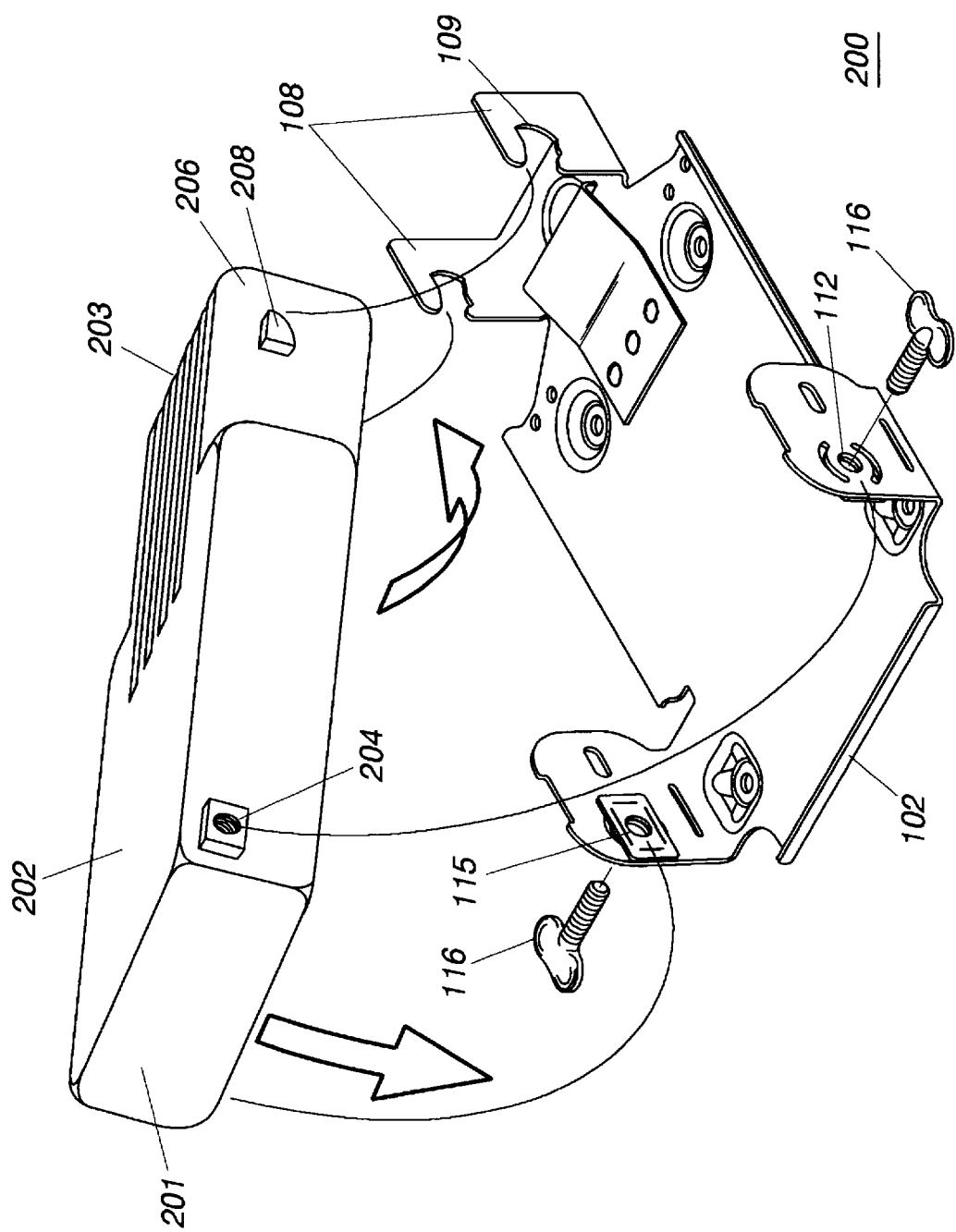
FIG. 2 is an isometric view of a radio assembly in accordance with the present invention.

Referring now to FIG. 2 (in conjunction with FIG. 1), a radio assembly 200 is shown in accordance with the preferred embodiment of the invention. A radio housing 202 has a plurality of substantially parallel planar fins 206 extending from a rear portion 203 of the housing. A pair of integral latching portions 208, each extending from a fin, provide a means for attaching radio housing 202 to mounting tray 102. Although FIG. 2 shows a latching portion extending from a single fin, in the preferred embodiment each latching portion is disposed between a pair of adjacent fins. Due to the cammed roll-in feature 109 of receiving portions 108, each latching portion 208 may only be received or removed with housing 202 held at an angle (as illustrated in FIG. 2). With a front portion 201 of the radio housing subsequently lowered—such that a pair of cavities 204 in the housing are each aligned with a fastener opening 112—latching portions 208 become lockably engaged with receiving portions 108. A pair of fasteners 116 each pass through a fastener opening 112 and a pad opening 115 to mate with one of the cavities 204. Although we prefer to use wing screws for fastening, other types of fasteners could be employed. Furthermore, one skilled in the art will realize that non-threaded fasteners, such as cotter pins, could be used.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A mounting apparatus for securing an electronic device, the device having cavities on opposing sides, the mounting apparatus comprising:

a mounting tray having a substantially planar surface, a pair of upstanding device attachment tabs, and a pair of rear receiving portions;

said planar surface having a front end, a rear end, and a plurality of recessed fastening locations;

said device attachment tabs having substantially parallel planes located along opposing sides of said planar surface proximate to the front end, each of said tabs having a fastener opening therethrough;

said rear receiving portions having cammed roll-in features for engaging a rear portion of said electronic device, each of said receiving portions intersecting the rear end of said planar surface and having a plane perpendicular to the rear end;

a pad affixed to an inner surface of each of said device attachment tabs, each said pad having a pad opening therethrough;

a spring having a middle section and a first end, the first end forming an integral spring stopping mechanism and the middle section fixedly attached to said planar surface; and a pair of fasteners for attaching said electronic device to said mounting tray, said fasteners each passing through a single fastener opening and a single pad opening, each of said fasteners attaching to one of the cavities in said electronic device.

2. The mounting apparatus of claim 1, wherein said fasteners comprise threaded wing screws.

3. The mounting apparatus of claim 1, wherein at least one of said recessed fastening locations has embossments for reducing stress.

4. The mounting apparatus of claim 1, further comprising at least one radial opening partially surrounding each said fastener opening.

5. The mounting apparatus of claim 1, wherein each said pad is an elastomer.

6. The mounting apparatus of claim 1, wherein said spring is fixedly attached to said planar surface by at least one rivet.

7. The mounting apparatus of claim 1, wherein said mounting tray is formed from a single sheet of metal.

8. A radio assembly, comprising:

a radio housing including sides having a pair of cavities formed therein, a rear portion having a plurality of substantially parallel planar fins, and a pair of integral latching_portions, each of said latching portions integrally attached to at least one of said fins; and a radio mounting apparatus, including:

a mounting tray having a substantially planar surface, a pair of upstanding radio attachment tabs, and a pair of radio receiving portions;

said planar surface having a front end, a rear end, and a plurality of recessed fastening locations;

said radio attachment tabs having substantially parallel planes located along opposing sides of said planar surface proximate to the front end, each of said tabs having a fastener opening therethrough;

said rear receiving portions having cammed roll-in features for engaging the integral latching portions of said radio housing, and each of said rear receiving portions intersecting the rear end of said planar surface and having a plane perpendicular to the rear end;

a pad affixed to an inner surface of each of said radio attachment tabs, each pad having a pad opening therethrough;

a spring having a middle section and a first end, the first end forming an integral spring stopping mechanism and the middle section fixedly attached to said planar surface; and a pair of fasteners for attaching said radio housing to said mounting tray, said fasteners each passing through a single fastener opening and a single pad opening, each of said fasteners attaching to one of the cavities in said radio housing.

9. The mounting apparatus of claim 8, wherein said fasteners comprise threaded wing screws.

10. The mounting apparatus of claim 8, wherein at least one of the recessed fastening locations has embossments for reducing stress.

11. The mounting apparatus of claim 8, further comprising at least one radial opening partially surrounding each said fastener opening.

12. The mounting apparatus of claim 8, wherein each said pad is an elastomer.

13. The mounting apparatus of claim 8, wherein said spring is fixedly attached to said planar surface by at least one rivet.

14. The mounting apparatus of claim 8, wherein said mounting tray is formed from a single sheet of metal.

15. A mounting apparatus for securing a mobile radio, the radio including opposing sides each having a threaded cavity therein and a rear portion having a pair of integral latching portions, the mounting apparatus comprising:

a metal mounting tray having a substantially planar surface, a pair of upstanding radio attachment tabs, and a pair of radio receiving portions;

said planar surface having a front end, a rear end, a pair of rear recessed fastening locations, and a pair of front recessed fastening locations having embossments for providing stress relief;

said radio attachment tabs having substantially parallel planes located along opposing sides of said planar surface proximate to the front end, each of said tabs having a fastener opening therethrough, and each said fastener opening surrounded by at least one radial opening;

said radio receiving portions having cammed roll-in features for lockably engaging said latching portions, each of said receiving portions intersecting the rear end of said planar surface and having a plane perpendicular to the rear end of said planar surface;

an elastomeric pad affixed to an inner surface of each of said radio attachment tabs, each said pad having a pad opening therethrough;

a spring for supporting a rear bottom portion of said mobile radio, said spring having a middle section and a first end, the first end forming an integral stopping mechanism and the middle section riveted to said planar surface; and a pair of threaded wing screws for attaching said mobile radio to said mounting tray, said wing screws each passing through a single fastener opening and a single pad opening, and each of said wing screws mating with one of the threaded cavities in said mobile radio.

* * * * *